(12) United States Patent
Larsson et al.

(10) Patent No.: US 8,775,835 B2
(45) Date of Patent: Jul. 8, 2014

(54) METHOD IN A CONTROLLER CONTROLLING A DYNAMIC COMPENSATOR, A CONTROLLER, COMPUTER PROGRAMS AND COMPUTER PROGRAM PRODUCTS

(71) Applicants: Tomas Larsson, Vasteras (SE); Karin Thorburn, Vasteras (SE); Stefan Thorburn, Vasteras (SE)

(72) Inventors: Tomas Larsson, Vasteras (SE); Karin Thorburn, Vasteras (SE); Stefan Thorburn, Vasteras (SE)

(73) Assignee: ABB Research Ltd. (CH)

( * ) Notice: Subject to any disclaimer, the term of this patent is extended or adjusted under 35 U.S.C. 154(b) by 0 days.

(21) Appl. No.: 14/070,159

(22) Filed: Nov. 1, 2013

(65) Prior Publication Data

US 2014/0059373 A1 Feb. 27, 2014

Related U.S. Application Data

(63) Continuation of application No. PCT/EP2011/074162, filed on Dec. 28, 2011.

(30) Foreign Application Priority Data

May 10, 2011 (WO) .................. PCT/EP2011/057543

(51) Int. Cl.
*G06F 1/26* (2006.01)
*H02J 3/18* (2006.01)
(52) U.S. Cl.
CPC .. *H02J 3/18* (2013.01); *G06F 1/263* (2013.01)
USPC .............................. 713/300; 307/48; 700/297

(58) Field of Classification Search
CPC .................................. G06F 1/263; H02J 3/18
USPC .............................. 307/48; 700/297; 713/300
See application file for complete search history.

(56) References Cited

U.S. PATENT DOCUMENTS

| | | |
|---|---|---|
| 3,886,426 A | 5/1975 | Daggett |
| 4,274,043 A | 6/1981 | Heitz |
| 4,287,267 A | 9/1981 | Whittlesey et al. |
| 5,121,046 A | 6/1992 | McCullough |
| 5,744,936 A | 4/1998 | Kawakami |

(Continued)

FOREIGN PATENT DOCUMENTS

| | | |
|---|---|---|
| WO | 0137299 A1 | 5/2001 |
| WO | 2007102758 A1 | 9/2007 |

OTHER PUBLICATIONS

International Preliminary Report on Patentability Application No. PCT/EP2011/074162 Completed: Apr. 24, 2013 11 pages.

(Continued)

*Primary Examiner* — Albert Wang
(74) *Attorney, Agent, or Firm* — St. Onge Steward Johnston & Reens LLC

(57) ABSTRACT

A method in a controller controlling a dynamic power compensator. The dynamic power compensator is arranged to provide active and reactive power to an electric power system, the dynamic power compensator including a battery energy storage. The method includes the steps of: monitoring a state of charge of the battery energy storage; detecting a voltage level in the electric power system requiring increased delivery of the reactive power to the electric power system; and controlling the battery energy storage in dependence on the monitored state of charge and detected voltage level. The invention also relates to a controller, computer programs and computer program products.

9 Claims, 3 Drawing Sheets

(56) References Cited

U.S. PATENT DOCUMENTS

| 5,898,291 | A | 4/1999 | Hall |
| 6,731,022 | B2 | 5/2004 | Silverman |
| 2005/0012395 | A1 | 1/2005 | Eckroad et al. |
| 2010/0066317 | A1* | 3/2010 | Angquist et al. ............. 323/210 |

OTHER PUBLICATIONS

International Search Report Application No. PCT/EP2011/074162 Completed: Mar. 15, 2012; Mailing Date; Mar. 22, 2012 3 pages.

Stefan G Johansson, Gunnar Asplund, Erik Jansson & Roberto Rudervall,"Power System Stability Benefits With VSC DC-Transmission Systems", B4-204 Session 2004, CIGRE.

* cited by examiner

METHOD IN A CONTROLLER CONTROLLING A DYNAMIC COMPENSATOR, A CONTROLLER, COMPUTER PROGRAMS AND COMPUTER PROGRAM PRODUCTS

FIELD OF THE INVENTION

The invention relates generally to the field of electrical power systems and in particular to reactive power compensation within such electrical power systems.

BACKGROUND OF THE INVENTION

A Static Var Compensator (SVC) and Static synchronous Compensator (STATCOM) provide reactive power to high-voltage electricity transmission systems and are used for regulating voltage and stabilizing the system.

In an electricity transmission system, denoted power grid in the following, electrical loads both generate and absorb reactive power. The transmission of active power with AC is also associated with reactive power consumption or generation. The load varies considerably during e.g. day and night, and the reactive power balance in the power grid thus also varies. The result can be unacceptable voltage amplitude variations, a voltage depression, or even a voltage collapse. A reactive power compensator can be arranged to continuously provide the reactive power required to control dynamic voltage swings under various power grid conditions and thereby improve the power system transmission and distribution performance. Installing a reactive power compensator at one or more suitable points in the network can increase transfer capability and reduce losses while maintaining a smooth voltage profile under different network conditions. In addition, the reactive power compensator can mitigate active power oscillations through voltage amplitude modulation.

A dynamic compensator is a reactive power compensator provided with an energy storage. Both active and reactive power support can thereby be supplied. By doing so, voltage variations as well as frequency variations and sudden load changes can be supported.

FIG. 1 illustrates such a dynamic power compensator 1, and in particular a Static synchronous Compensator (STATCOM) comprising a Voltage Source Converter (VSCs) 2. The VSC 2 is on its AC side connected to a power grid 7, typically via a reactor 5 and transformer 6.

The VSC 2 is on its DC side connected to a capacitor bank 3, constituting a DC voltage source. The dynamic power compensator 1 can further be provided with a battery energy storage 4, comprising one or more strings of batteries. The battery energy storage 4 may for example be used in power grids that e.g. require frequency regulation essential for grid stability and short term power support to cover variations in load demand or intermittency in power generation.

The batteries of the battery energy storage 4 are connected in strings with a DC interruptor embodied e.g. by IGBTs, and disconnectors. The battery energy storage 4 may comprise a number of series- and/or parallel-connected battery cells arranged in battery units and several battery units may be series-connected to form a battery string. The battery energy storage 4 may comprise several such strings connected in parallel.

The battery state of charge (SOC) is reduced due to power discharge. For e.g. Li-Ion batteries, the voltage varies with the SOC. The voltage from the battery energy storage 4 may thus vary considerably during a charge-discharge cycle. The reactive power output capability of the dynamic power compensator 1 is dependent on the DC voltage level and will hence be reduced with decreasing SOC. This in turn affects the design of the dynamic power compensator 1 in that the battery energy storage 4 has to be over-dimensioned to be able to handle the voltage variations, e.g. by dimensioning the battery energy storage suitably. This is a costly solution that, for example, requires many components and also a large footprint.

SUMMARY OF THE INVENTION

An object of the invention is to overcome or at least alleviate the above-mentioned problems. In particular, it is an object of the invention to provide means and methods for optimizing battery energy storage use.

The object is according to a first aspect of the invention achieved by a method in a controller controlling a dynamic power compensator. The dynamic power compensator is arranged to provide active and reactive power to an electric power system and comprises a battery energy storage. The method comprises the steps of: monitoring a state of charge of the battery energy storage; detecting a voltage level in the electric power system requiring increased delivery of the reactive power to the electric power system; controlling the battery energy storage in dependence on the monitored state of charge and detected voltage level.

By means of the invention, the loadability of the load in the vicinity of the dynamic power compensator is maximized by providing optimum balance of active power P and reactive power Q depending on the State Of Charge (SOC) of the battery energy storage. For example, disconnection of the whole battery energy storage at very low SOC levels can be made to enhance the delivery of reactive power to the electrical power system. The full potential of the dynamic power compensator's reactive power can be used, coordinated with active power from the battery energy storage. Further, the invention enables disconnection of one or more battery strings for maintenance reasons. The reduction in voltage variations provided by the invention, also leads to a dynamic power compensator design with fewer battery rooms and improved reactive power capability. This in turn allows a higher loadability or power supply capacity in the vicinity of the compensator which means a more effective use of the transmission system.

In an embodiment, the step of monitoring comprises receiving, by means of an input/output device, data from a battery management unit arranged to supervise the battery energy storage.

In an embodiment, the step of detecting a voltage change in the electrical power system comprises receiving input signals from measurement devices arranged in the electric power system and/or from an overall control system.

In an embodiment, the step of controlling the battery energy storage comprises sending commands for re-configuring the battery energy storage in dependence on the monitored state of charge and detected voltage level.

In the above embodiment, the step of sending commands for re-configuring the battery energy storage may comprise sending open and/or close signals to breakers and/or interrupters arranged within the battery energy storage.

In an embodiment, the step of monitoring comprises detecting a low state of charge of the battery energy storage, and the step of controlling comprises sending commands for disconnecting the battery energy storage, thereby providing increased reactive power delivered by the static var compensator to the electric power system.

In an embodiment, the step of controlling comprises sending open/close commands to breakers arranged within the battery energy storage for re-configuring the battery energy storage so that the DC voltage from the battery energy storage is increased.

In an embodiment, the battery energy storage comprises two or more battery strings each battery strings comprising at least one battery unit, and wherein the two or more battery strings are re-configured by connecting one of the at least one battery units from one battery string to another battery string.

In an embodiment, in the step of detecting the voltage level, the voltage level is detected to fall outside a pre-set steady state voltage interval, and the step of controlling comprises increasing or decreasing the reactive power and/or optimizing the active power by sending commands for disconnecting the battery energy storage or by sending commands for re-configuring the battery energy storage.

In an embodiment, the dynamic power comprises a voltage source converter connected at a DC side thereof to the battery energy storage.

The object is according to a second aspect of the invention achieved by a controller for controlling a dynamic power compensator. The dynamic power compensator is arranged to provide active and reactive power to an electric power system, and comprises a battery energy storage. The controller comprises a processor arranged to: monitor a state of charge of the battery energy storage; detect a voltage level in the electric power system requiring increased delivery of the reactive power to the electric power system; and control the battery energy storage in dependence on the monitored state of charge and detected voltage level.

The object is according to a third aspect of the invention achieved by a computer program for a controller controlling a dynamic power compensator, the dynamic power compensator arranged to provide active and reactive power to an electric power system. The computer program comprises computer program code, which, when run on the controller, causes the controller to perform the steps of: monitoring a state of charge of the battery energy storage; detecting a voltage level in the electric power system requiring increased delivery of the reactive power to the electric power system; and controlling the battery energy storage in dependence on the monitored state of charge and detected voltage level.

The object is according to a fourth aspect of the invention achieved by a computer program product comprising a computer program as above, and a computer readable means on which the computer program is stored.

Further features and advantages of the invention will become clear upon reading the following description and the accompanying drawings.

DETAILED DESCRIPTION OF THE INVENTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary detail. Like numbers refer to like elements throughout the description.

Figure 1:
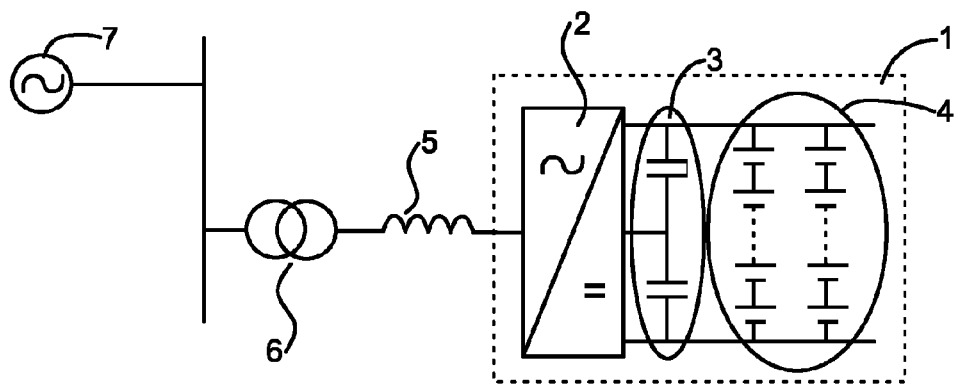
FIG. 1 illustrates a dynamic power compensator.

Briefly, the invention provides means and methods for optimizing the use of a battery energy storage of a dynamic power compensator as described with reference to FIG. 1. The loadability of the dynamic power compensator is maximized by means of a controller arranged to provide optimum balance of active power P and reactive power Q depending on the state of charge (SOC) of the battery energy storage connected thereto.

Figure 2:
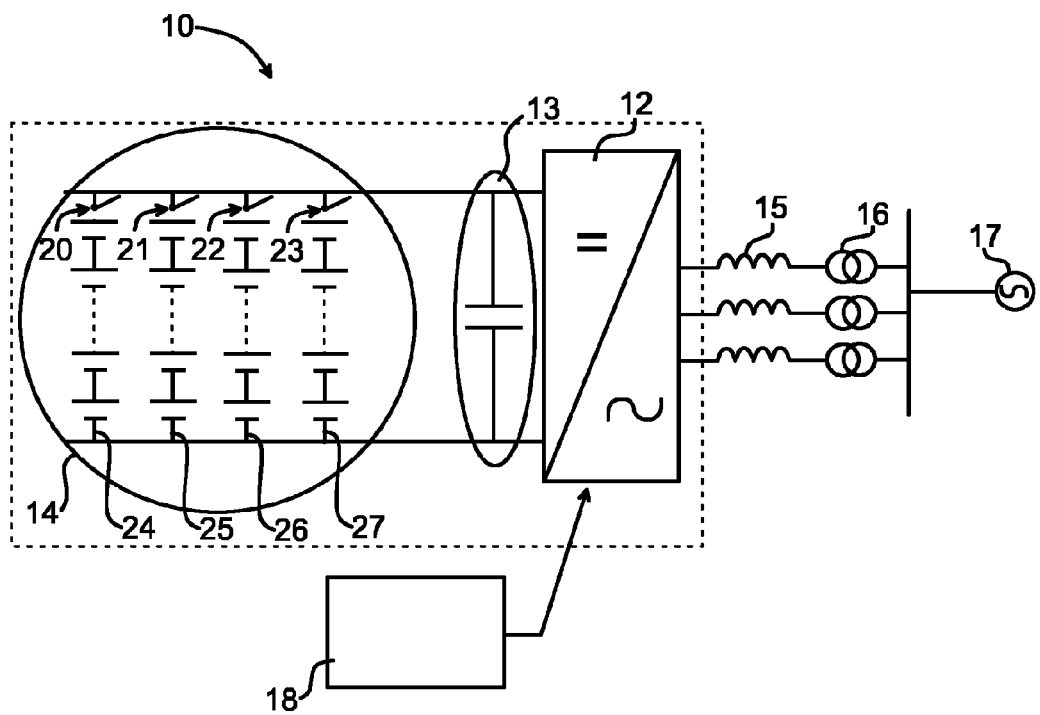
FIG. 2 illustrates schematically an environment in which embodiments of the invention may be implemented.

FIG. 2 illustrates schematically an environment in which embodiments of the invention may be implemented. In particular, a dynamic power compensator is illustrated comprising voltage source converters (VSCs) 12. The VSC 12 is on its AC side connected to an electric power system, in the following denoted power grid 17. The VSC 12 is typically connected to the power grid 1 via a reactor 15 and transformer 16, in line with the set up of FIG. 1.

The dynamic power compensator 10 further comprises DC energy storage 13, 14. In particular, the VSC 12 is on its DC side connected to a capacitor bank 13, and to a battery energy storage 14, comprising one or more strings of batteries. The battery energy storage 14 may comprise a Li-ion battery system providing the necessary power to maintain stability of the power grid 17. As an example, for Li-Ion batteries, the voltage varies with the SOC, from e.g. 4 V per battery cell at 100% SOC down to 3 V per cell at 0% SOC (i.e. empty batteries).

In an embodiment, the battery energy storage 14 comprises a number of series- and/or parallel-connected battery cells arranged in battery units and several battery units may be series-connected to form a battery string 24, 25, 26, 27. In the illustrated case, four such battery strings 24, 25, 26, 27 are provided and connected in parallel between negative and positive DC busbars of the VSC 12.

The battery energy storage 14 may further comprise one or more Battery Management Unit(s) (BMU, not illustrated) performing a number of different tasks. Among other things, the battery management unit measures different parameters such as battery currents, cell- and battery voltages, temperature, and also the battery State-Of-Charge (SOC), and performs cell balancing, handles internal communication between battery modules and handles communication in order to send and receive data to/from a controller 18 controlling the dynamic power compensator 10. Each battery string 24, 25, 26, 27 may be provided with a respective battery management unit, or each battery unit may be provided with its own battery management unit.

The battery energy storage 14 is further provided with a number of fast breakers, exemplified at reference numerals 20, 21, 22, 23. For example, such breakers may be arranged between each battery string 24, 25, 26, 27 and the VSC 12.

The battery energy storage 14 is described further later on, particularly with reference to FIGS. 3, 4, and 5.

The controller 18 is arranged to control the dynamic power compensator 10 so that the dynamic power compensator 10 delivers power support (reactive power Q and active power P) to the power grid 17. The controller 18 is arranged to receive inputs from remote measurement devices (not illustrated) such as voltage transformers and current transformers, typically provided via intelligent electronic devices. The controller 18 may also receive inputs from control systems such as SCADA (Supervisory Control And Data Acquisition) and/or battery management units as described earlier.

The frequency and voltage of the power grid 17 is said to be stable when the same amount of power is injected from power generators as are consumed by the load. To enable the stable voltage level, reactive power balance has to be provided. In a normal state of the power grid 17, i.e. in a steady state wherein voltage levels are within an acceptable and pre-set range, the battery energy storage 14 may be used for energy trading or recharging it to a desired SOC.

When the voltage within the power grid 17 is detected to deviate outside the range, actions have to be taken to ensure stability of the power grid 17. Such actions comprise e.g. reactive power Q compensation. The power grid 17 voltage may for example decay slowly, for example after some kind of contingency. If not combatted, i.e. responded to, the reduced level of reactive power will affect larger and larger areas of the power grid 17. The power grid 17, and the dynamic power compensator 10, comprises protection levels and maximum transfer capabilities, which when reached cause a sudden change of power grid 17 characteristics.

The detection of deviations of the pre-set voltage level within the power grid 17 can thus be performed in different ways.

The invention provides a method for using the energy stored in the battery energy storage 14 and the output reactive power output in an optimized way. In one embodiment, the loadability is maximized given a certain available amount of stored energy. The reactive power Q is mainly dependent on the voltage difference between the AC voltage that the VSC 12 can generate from the DC voltage of the DC energy storage 13, 14 and the power grid 17 AC voltage. A high AC voltage in the power grid 17 gives a low difference between the maximum DC voltage and the AC voltage. The reactive power capability is then moderate but increases with decreasing AC voltage.

The maximum DC current from and to the battery energy storage 14 can vary with the direction of the battery current. As mentioned earlier, the SOC level of the batteries are important since this level relates to the DC bus voltage. For a low SOC level, the maximum reactive power output will be reduced.

Figure 3:
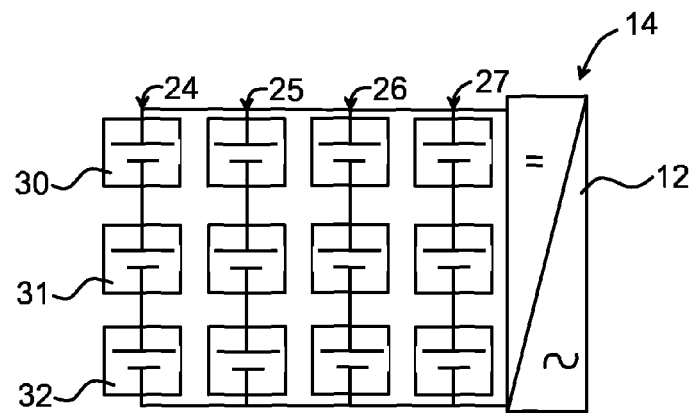
FIG. 3 illustrates a battery energy storage when batteries have a high state of charge.

FIG. 3 illustrates the battery energy storage 14, in an exemplifying configuration when the batteries have a high SOC. In the exemplifying case, four battery strings 24, 25, 26, 27 are connected in parallel to the VSC 12. Each battery string 24, 25, 26, 27 is illustrated to comprise three series-connected battery units, e.g. battery string 24 comprises battery units 30, 31, 32.

Figure 4:
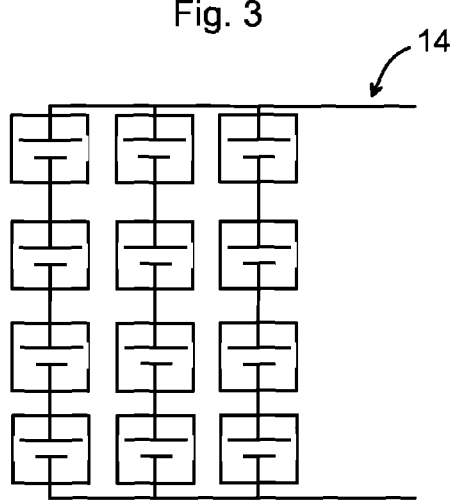
FIG. 4 illustrates a battery energy storage when batteries have a low state of charge.

FIG. 4 illustrates the battery energy storage 14, in an exemplifying configuration when the battery units have low SOC. In particular, in order to provide a desired DC voltage, the configuration of FIG. 3 is reconfigured so that the number of battery strings 24, 25, 26, 27 is reduced and the number of battery units in each battery string is increased. Thereby an increased DC voltage is provided by the battery energy storage 14.

Figure 5:
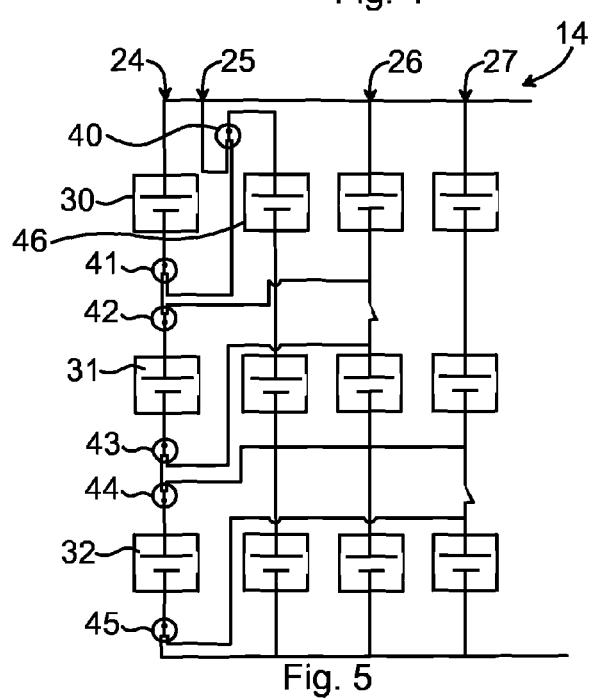
FIG. 5 illustrates a means for reconfiguring the battery energy storage of FIGS. 3 and 4.

FIG. 5 illustrates an exemplifying implementation for reconfiguring the battery energy storage 14 from the high SOC configuration of FIG. 3 to the low SOC configuration of FIG. 4, and vice versa. In particular, a number of high-speed breakers (typically with an operating time less than 40 ms), in particular two-position breakers, in the following denoted breakers, is used in the battery energy storage 14. In FIG. 5, a first battery string 24 is arranged with breakers at each side of each battery unit 30, 31, 32. That is, a first battery unit 30 of the first battery string 24 is connected to the VSC 12. Between the first battery unit 30 and a series-connected second battery unit 31 in the first battery string 24, there are provided two breakers 41, 42. Similarly, between the second battery unit 31 and a third series-connected battery unit 32 in the first battery string 24, there are provided two breakers 43, 44. The third battery unit 32 is connected to the VSC 12 via yet another breaker 45. First battery unit 46 of the second battery string 25 is connected to the VSC 12 through a breaker 40. When the breakers 40, 41, 42, 43, 44, 45 are closed (utilizing the leftmost current paths) the high SOC configuration of FIG. 3 is obtained. When the breakers 40, 41, 42, 43, 44, 45 are open (utilizing the rightmost current paths), the low SOC configuration of FIG. 4 is obtained.

Stated differently, when switching from the high SOC configuration to the low SOC configuration, each battery unit 30, 31, 32 of the first battery string 24 is connected in series with the battery units of a respective battery string 25, 26, 27 among the remaining battery strings.

The breakers are chosen so that the reconfiguration time of the system is as low as possible. Examples of such breakers comprise two-position disconnectors, two-position transfer switch based on a fast transfer switch, such as disclosed in International Patent Publication WO 0137299, assigned to the same applicant as the present application.

Preferably, IGBT valves are used for temporarily blocking the current in the battery energy storage 14 to allow the desired mechanical reconfiguration. The switch-over should be made rapidly in order not to affect the power grid 17, for example within 5-40 ms depending on choice of mechanical switch.

As another advantage, it can be mentioned that the illustrated set-up allows for disconnection of one or more battery strings also for maintenance reasons.

Figure 6:
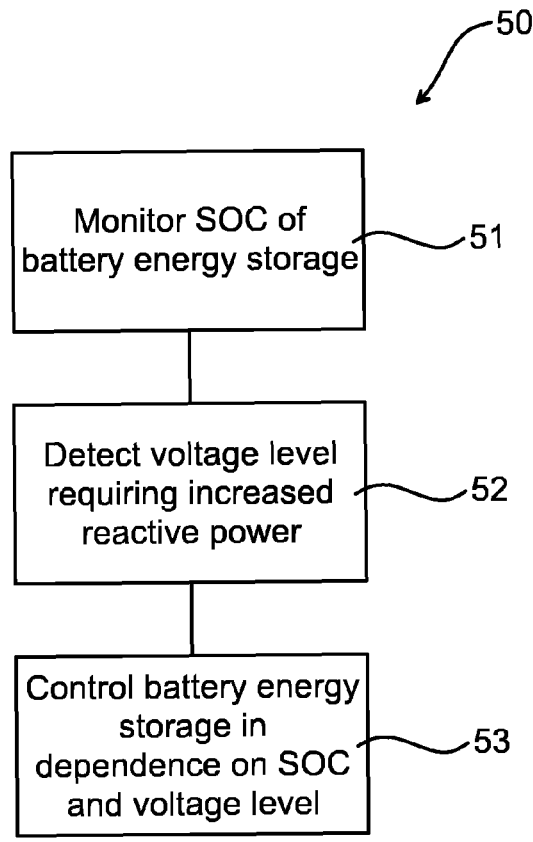
FIG. 6 illustrates a flow chart over steps of a method in accordance with an aspect of the invention.

FIG. 6 illustrates a flow chart over steps of a method performed in the controller 18. The method 50 comprises the first step of monitoring 51 a state of charge of the battery energy storage 14. This can be done by the controller 18 receiving data regarding the SOC from the earlier mentioned battery management units. The monitoring can be performed continuously, i.e. the controller 18 continuously receiving data from suitable battery management units, or regularly, e.g. at predetermined points of time.

The method 50 comprises the second step of detecting 52 a voltage level in the electric power system 17 that requires increased delivery of the reactive power Q to the electric power system 17. As mentioned, such need can for example be detected by determining that a voltage measured in the power grid 17 is outside a range defined as steady state operation. Measurement data can be received from various devices, and/or from the SCADA system.

The method 50 comprises the third step of controlling 53 the battery energy storage 14 in dependence on the monitored state of charge and detected voltage level.

In dependence on the SOC and in view of status and need of the power grid 17, the controller can send commands for re-configuring the battery energy storage 14. The commands may comprise sending open and/or close signals to suitable ones of the breakers 40, 41, 42, 43, 44, 45. The battery energy storage 14 can for example be re-configured so that the DC voltage from the battery energy storage 14 is increased, as was described with reference to FIGS. 3-5.

In an embodiment, the step of monitoring 51 comprises detecting a low SOC of the battery energy storage 14. The step of controlling 53 then comprises sending commands for disconnecting the entire battery energy storage 14. Thereby the reactive power Q delivered by the dynamic power compensator 10 to the electric power grid 17 is increased and voltage instabilities in the power grid 17 can be alleviated.

In an embodiment, in the step of detecting 52 the voltage level, the voltage level is detected to fall outside a pre-set steady state voltage interval. The step of controlling 53 then comprises increasing or decreasing the reactive power Q and/or adjusting the active power P such that the reactive power losses in the grid are reduced. This may be done by sending commands for disconnecting the battery energy storage 14 or by sending commands for re-configuring the battery energy storage 14. It is possible to, in certain cases, derive an optimal value for P, see for instance reference [Stefan G Johansson, Gunnar Asplund, Erik Jansson & Roberto Rudervall, "POWER SYSTEM STABILITY BENEFITS WITH VSC DC-TRANSMISSION SYSTEMS", B4-204 Session 2004, CIGRE].

Figure 7:
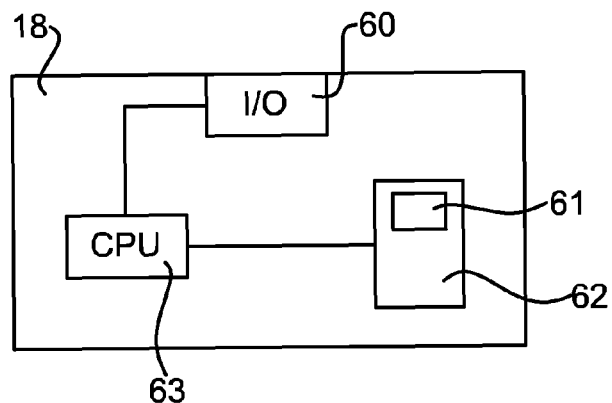
FIG. 7 illustrates means for implementing methods of FIG. 6, and in particular a controller.

The invention also encompasses the controller 18. FIG. 7 illustrates the controller 18 and in particular means for implementing the described methods. The controller 18 comprises a processor 63, e.g. a central processing unit, microcontroller, digital signal processor (DSP), etc., capable of executing software instructions stored in a computer program product 62 e.g. in the form of a memory. The processor 63 is connected to an input/output device 60 that receives inputs from remote measurement devices and/or from control systems such as SCADA, as mentioned earlier. It is noted that although only one processor 63 is illustrated in FIG. 7, the implementation may comprise distributed hardware so that several CPUs are used rather than one when running the software.

The described methods and algorithms or parts thereof for use in controlling the dynamic power compensator 10 may be implemented e.g. by software and/or application specific integrated circuits in the controller 18. To this end, the controller 18 may further comprise a computer program 61 stored on the computer program product 62.

With reference still to FIG. 7, the invention also encompasses such computer program 61 for controlling the dynamic power compensator 10. The computer program 61 comprises computer program code which when run on the controller 18, and in particular the processor 63 thereof, causes the controller 18 to perform the methods as described.

The computer program product 62 is also provided comprising the computer program 61 and computer readable means on which the computer program 61 is stored. The computer program product 83 can be any combination of read and write memory (RAM) or read only memory (ROM). The computer program product 62 may also comprise persistent storage, which, for example can be any single one or combination of magnetic memory, optical memory, or solid state memory.

What is claimed is:

1. A method in a controller controlling a dynamic power compensator, the dynamic power compensator arranged to provide active and reactive power to an electric power system, the dynamic power compensator comprising a battery energy storage, the battery energy storage comprises two or more battery strings each battery strings comprising at least one battery unit, the method comprising the steps of:
monitoring a state of charge of the battery energy storage,
detecting a voltage level in the electric power system requiring increased delivery of the reactive power to the electric power system, and
controlling the battery energy storage in dependence on the monitored state of charge and detected voltage level, wherein the step of controlling comprises sending open/close commands to breakers arranged within the battery energy storage for re-configuring the battery energy storage, wherein the two or more battery strings are re-configured by connecting one of the at least one battery units from a first battery string to another battery string, so that the battery unit of the first battery string is connected in series with the battery units of the other battery string, wherein the number of battery units in the other battery string is increased.

2. The method as claimed in claim 1, wherein the step of monitoring comprises receiving, by means of an input/output device, data from a battery management unit arranged to supervise the battery energy storage.

3. The method as claimed in claim 1, wherein the step of detecting a voltage change in the electrical power system comprises receiving input signals from measurement devices arranged in the electric power system and/or from an overall control system.

4. The method as claimed in claim 1, wherein the step of monitoring comprises detecting a low state of charge of the battery energy storage, and the step of controlling comprises sending commands for disconnecting the battery energy storage, thereby providing increased reactive power delivered by the dynamic power compensator to the electric power system.

5. The method as claimed in claim 1, wherein in the step of detecting the voltage level, the voltage level is detected to fall outside a pre-set steady state voltage interval, and the step of controlling comprises increasing or decreasing the reactive power and/or the active power by sending commands for disconnecting the battery energy storage or by sending commands for re-configuring the battery energy storage.

6. The method as claimed in claim 1, wherein the reactive power compensator comprises a voltage source converter connected at an DC side thereof to the battery energy storage.

7. A controller for controlling a dynamic power compensator, the dynamic power compensator being arranged to provide active and reactive power to an electric power system, the dynamic power compensator comprising a battery energy storage, the battery energy storage comprises two or more battery strings each battery strings comprising at least one battery unit, the controller comprising a processor arranged to:
monitor a state of charge of the battery energy storage,
detect a voltage level in the electric power system requiring increased delivery of the reactive power to the electric power system, and
control the battery energy storage in dependence on the monitored state of charge and detected voltage level, including sending open/close commands to breakers arranged within the battery energy storage for re-configuring the battery energy storage, wherein the two or more battery strings are re-configured by connecting one of the at least one battery units from a first battery string to another battery string, so that the battery unit of the first battery string is connected in series with the battery units of the other battery string, wherein the number of battery units in the other battery string is increased.

8. A computer program for a controller controlling a dynamic power compensator, the dynamic power compensator arranged to provide active and reactive power to an electric power system, the dynamic power compensator comprising a battery energy storage, the battery energy storage comprises two or more battery strings each battery strings comprising at least one battery unit, the computer program comprising computer program code, which, when run on the controller, causes the controller to perform the steps of:

monitoring a state of charge of the battery energy storage, detecting a voltage level in the electric power system requiring increased delivery of the reactive power to the electric power system, and controlling the battery energy storage in dependence on the monitored state of charge and detected voltage level, wherein the step of controlling comprises sending open/close commands to breakers arranged within the battery energy storage for re-configuring the battery energy storage, wherein the two or more battery strings are re-configured by connecting one of the at least one battery units from a first battery string to another battery string, so that the battery unit of the first battery string is connected in series with the battery units of the other battery string, wherein the number of battery units in the other battery string is increased.

9. A computer program product comprising a computer program as claimed in claim 8, and a computer readable means on which the computer program is stored.

* * * * *